United States Patent Office 3,536,774
Patented Oct. 27, 1970

3,536,774
PRODUCTION OF CONJUGATED DIOLEFINES BY CATALYTIC DECOMPOSITION OF 1,3-DIOXANES
Kazuo Itoi and Sunao Kyo, Kurashiki, Japan, assignors to Kurashiki Rayon Co. Ltd., Kurashiki, Okayama Prefecture, Japan, a corporation of Japan
No Drawing. Filed Feb. 20, 1969, Ser. No. 801,197
Claims priority, application Japan, Feb. 29, 1968, 43/13,096
Int. Cl. C07c 1/00, 1/20; B01j 11/82
U.S. Cl. 260—681   10 Claims

ABSTRACT OF THE DISCLOSURE

A method of producing conjugated diolefines by catalytic decomposition of mono- or di-alkyl-1,3-dioxane in vapor phase, in the presence of steam and a solid phosphoric acid catalyst, and at an elevated temperature, which is characterized in that the said other phosphoric acid catalyst contains at least one aromatic aminosulfonic acid.

---

This invention relates to a process for the production of conjugated diolefines, by catalytic decomposition of mono- or di-alkyl-1,3-dioxanes, using an improved solid phosphoric acid catalyst.

Catalytic decomposition of mono- or di-alkyl-1,3-dioxanes to produce corresponding conjugated diolefin is known. For example, catalytic decomposition of 4-methyl-1,3-dioxane gives butadiene as the main product, and that of 4,4-, or 4,5-dimethyl-1,3-dioxane gives mainly isoprene. Such production of conjugated diolefines by catalytic decomposition of 1,3-dioxanes constitutes one significant step in the preparation of conjugated diolefines from monoolefines and formaldehyde, utilizing the mechanism normally referred to as Prins reaction.

Conventional type solid phosphoric acid catalyst, which is prepared by mixing a carrier composed mainly of silica with ortho- or pyro-phosphoric acid and calcining the mixture at a temperature below 600° C., is known as one type of the catalysts effective for decomposition of 1,3-dioxane. There are also numbers of proposals for improving such conventional solid phosphoric acid catalyst. For example, U.S. Pat. No. 3,221,075 (corresponding to British Pat. No. 1,027,687, German Pat. No. 1,231,682, French Pat. No. 1,338,680, and Italian Pat. No. 677,329) discloses a process for improving the catalytic activity and the selectivity toward diolefine formation of the ordinary solid phosphoric acid catalyst, by calcining the same at a temperature not lower than 700° C., and optionally further extracting water-soluble substances in the calcined product with water. Also U.S. Pat. 3,284,534 (corresponding to French Pat. No. 1,453,657 and Italian Pat. No. 733,021) describes calcining the catalyst from which the water-soluble substances have been extracted with water as in the above at a temperature not higher than 1,100° C.

However, in the case of all known solid phosphoric acid catalysts including those improved by the high temperature-calcination described in the above U.S. patents, heavy deposition of carbonized by-products and the like take place on the catalysts, and consequently the catalytic activity decreases remarkably under a prolonged reaction time. Thus, the catalysts are unsatisfactory for a long-period reaction. Furthermore, the yield of formaldehyde is generally low in the reactions using the above known catalysts.

Therefore, the object of this invention is to provide a process for producing conjugated diolefines from 1,3-dioxanes, using an improved solid phosphoric acid catalyst, thereby reducing deposition of carbonized by-products and the like on the catalyst and improving the yield of formaldehyde.

It is now discovered that addition of aromatic aminosulfonic acid to the above known solid phosphoric acid catalyst is effective for reducing the deposition of carbonized by-products and the like on the catalyst, and consequently for extending catalyst life without decreasing its catalytic activity, and also effective for improving the yield of formaldehyde.

Thus the present invention relates to a process for the preparation of conjugated diolefines by catalytic decomposition of mono- or di-alkly-1,3-dioxanes at an elevated temperature in the presence of a solid phosphoric acid catalyst, characterized in that the reaction is performed in the presence of a solid phosphoric acid catalyst to which at least one aromatic aminosulfonic acid is added.

As the aromatic aminosulfonic acid to be added to the solid phosphoric acid catalyst in accordance with the invention, the compounds having same numbers of amino groups and sulfonic acid groups on their aromatic ring are useful. The aromatic aminosulfonic acid desirable for purpose of this invention can be expressed by the general formulae (Formula I and Formula II) below:

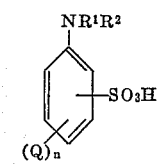

Formula I in which of $R^1$ and $R^2$ is a hydrogen atom or an alkyl group of 1–4 carbon atoms, and $R^1$ and $R^2$ may form a heterocyclic group such as alkyleneimino group together with the nitrogen atom,
Q is hydrogen or an optional substituent group other than an amino or a sulfonic acid group, for example, a halogen atom, hydroxy group, nitro group, an alkyl or alkoxy group of 1–4 carbon atoms, and
$n$ is an integer of 1 or 2, when $n$ is 2 and Q is an alkyl group, the two alkyl groups may together form an alkylene chain
and

Formula II in which $R^1$, $R^2$, Q and $n$ have the same significations as defined in Formula I.

More specifically, such useful compounds include:

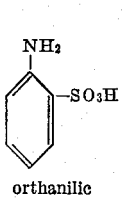 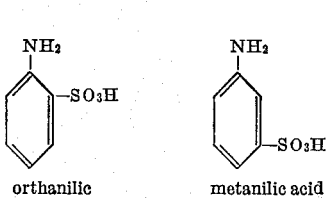 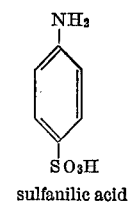

orthanilic      metanilic acid      sulfanilic acid

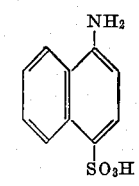 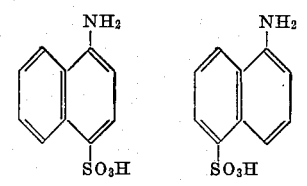 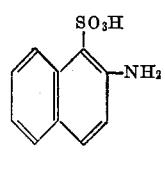

naphthionic acid    Laurent's acid    Tobias' acid such compounds containing, besides amino and sulfonic acid groups, sustituents such as alkyl and nitro groups, halogen atoms, etc., such as 5-bromo-2-aminobenzenesulfonic, 5 - nitro - 2 - aminobenzenesulfonic, 4 -aminotoluenesulfonic (3), 2 - aminotoluenesulfonic (4), 4 - chloro - 3 - aminobenzenesulfonic, 2,5 - dichloro-4-aminobenzenesulfonic, 3-bromo-4-aminobenzenesulfonic, 3,5-dinitro - 4 - 4-aminobenzenesulfonic, 6 - aminotoluenesulfonic (3), 2-chloro-6-aminotoluenesulfonic (3), 6-amino-o-xylenesulfonic (3), 8-aminotetrolinsulfonic (6), 4- amino - 8 - nitronaphthalenesulfonic, and 4 - chloro - 5 - aminonaphthalenesulfonic acids and isomers thereof; and such compounds in which at least one hydrogen atom of the amino group is substituted by an alkyl group, such as 2-methylaminobenzenesulfonic, 4 - methylaminobenzenesulfonic, and 6-nitro-3-dimethylaminobenzenesulfonic acids, etc. It is also permissable to use more than one of those aromatic aminosulfonic acids. Any method which enables the solid phosphoric acid catalyst to carry the desired amount of such aromatic aminosulfonic acid may be used for the addition of the aromatic aminosulfonic acid or acids to the catalyst. For example, the admixture of the desired amount of pulverized aromatic aminosulfonic acid and solid phosphoric acid catalyst may be molded into a desired shape or solid phosphoric acid catalyst and aromatic aminosulfonic acid may be pulverized together and formed into a shaped catalyst. Or the solid phosphoric acid catalyst may be immersed in an aromatic aminosulfonic acid solution and taken out to be dried, or the mixture may be evaporated to dryness. Preferred amount of the aromatic aminosulfonic acid ranges 0.5–50 wt. percent to the total weight of the catalyst containing the aromatic aminosulfonic acid. When the amount of the added aromatic aminosulfonic acid is less than 0.5 wt. percent, the improving effect of the additive is insufficient. Whereas, when it exceeds 50 wt. percent, the useful activity inherent in the solid phosphoric acid catalyst is impaired. Particularly preferred amount of the aromatic aminosulfonic acid to be added to the catalyst ranges 0.5–30 wt. percent.

The solid phosphoric acid catalyst to be employed in the invention includes those ordinary catalysts which are prepared by mixing ortho- or pyro-phosphoric acid with a carrier composed mainly of silica, such as diatomaceous earth, silica gel, white carbon, quartz sand, etc., at a weight ratio of phosphoric acid/carrier ranging from 0.5 to 5.0, preferably from 1.0 to 4.0, and calcining the mixture at a temperature not higher than 600° C., for example, 250°–600° C., for 1–10 hours, as well as those prepared by calcining the above conventional products further at higher temperatures, for example, 700°–1,100° C., for at least 2 hours, preferably at least 5 hours, inter alia, at least 10 hours, and, if necessary, thereafter extracting the water-soluble components from the calcined products. Likewise, regenerated catalysts, i.e., the above-described catalysts once employed in the production of conjugated diolefines from 1,3-dioxanes, from which the deposit has been eliminated by, for example, calcining the catalysts at 400°–1,000° C., may also be used. Particularly preferred catalysts are those prepared by calcination at 700°–1,100° C. for a prolonged period, and the above regenerated catalyst. With such high temperature-calcined solid phosphoric acid catalysts, addition of relatively small amount of the aromatic aminosulfonic acid achieves greater effect.

The catalytic decomposition reaction of 1,3-dioxane using the solid phosphoric acid catalyst added with the aromatic aminosulfonic acid in accordance with the invention is performed by passing the starting dioxane and water, both in vapor phase, through the catalyst bed. The reaction may be performed in the concurrent presence of an inert gas such as nitrogen, carbon dioxide, etc., to prevent objectionable side reactions in the reaction zone. The feed ratio of the starting 1,3-dioxane and steam can be selected from a wide range, such as 1:01–1:10 (by weight). By the use of the improved catalyst in accordance with the invention, the decomposition reaction progresses smoothly even when the proportion of introduced steam is relatively less, compared with the conventional solid phosphoric acid catalyst. That is, when the conventional solid phosphoric acid catalyst is used catalyst is used, favorable result is obtained only when the weight ratio of steam to 1,3-dioxane is between 1.5:1 and 2:1. Whereas, in the present process of this invention high selectivity can be obtained even when the weight of steam to that of dioxane used is equal. Consequently, the present process is more advantageous, in respect to the quantity of heat required for the reaction and the recovery of formaldehyde. Preferred reaction temperature ranges from 100°–300° C., particularly 150°–280° C. In most cases the upper limit of temperature is determined by the decomposition temperature of the aromatic aminosulfonic acid employed. Therefore, when a high reaction temperature is desirable, the aminosulfonic acids having high decomposition temperatures must be used. The reaction is normally performed at atmospheric pressure, but increased or reduced pressures may also be used if necessary. The catalyst may be used in any manner of fluidized, moving, or fixed bed.

The thus-formed conjugated diolefines are cooled and condensed, and thereafter can be separated from unreacted 1,3-dioxane and the other products or intermediate products, by the well-known procedures such as decantation followed by distillation.

The unreacted 1,3-dioxane, and the formaldehyde and monoolefin formed in the decomposition reaction are each isolated and recovered. The 1,3-dioxane may be recycled into the decomposition reaction system, and the other two can be re-used for the synthesis of alkyl-1,3-dioxane.

EXAMPLE 1

A conventional solid phosphoric acid catalyst prepared by mixing diatomaceous earth and ortho-phosphoric acid at a weight ratio of 1:4 was calcined in an electric oven at 980° C. for 45 hours. The resulting high temperature-calcined solid phosphoric acid catalyst was immersed in a saturated aqueous sulfanilic acid solution at 100° C. for 5 minutes, then withdrawn and dried. The sulfanilic acid deposited on the catalyst was approximately 3 wt. percent based on the total weight of the catalyst. Fifteen (15) ml. of the catalyst was charged in a tubular reactor fixed in an oil bath of 200° C., and into which 4,4-dimethyl-1,3-dioxane (MDO) (liquid), water (liquid), and nitrogen as a carrier gas were introduced through a vaporizer at the rates of, respectively, 10 ml./hr., 20 ml./hr., and 1 liter/hr. to perform the reaction. The reaction mixture was condensed and absorbed by a condenser and an absorbent diisopropyl ether in an ice bath, and furthermore completely collected in an acetone-dry ice trap. Quantitative analysis of the isoprene and unreacted MDO in the organic layer was performed by gas chromatography, and that of formaldehyde in the aqueous layer, by sodium sulfite method. Analysis was carried out at every three hours and the results of the analysis of the reaction mixture collected during the three hours ending at the 51st hour of the reaction were as follows: MDO conversion, 82.1%; isoprene yield, 11.3 g., selectivity toward isoprene, 82.3%, and selectivity toward formaldehyde, 80.2%. At that time, the weight increase of the catalyst caused by deposition of by-products thereon was 70.3 wt. percent. The deposit on the catalyst was in the form of fine powder.

In contrast, when the above reaction was repeated by the same procedure except that no sulfanilic acid was added to the catalyst, the MDO conversion was 82.6%, isoprene yield was 11.25 g., selectivity toward isoprene was 80.4%, and selectivity toward formaldehyde was 72.2% after 6 hours. During 6–9 hours' reaction, however, the above values decreased to, respectively, 59.9%, 6.74 g., 66.5%, and 72.6%. The weight increase of the catalyst at that time was 84.6%. The deposit was in the form of lustrous tar, which densely covered the catalyst.

EXAMPLE 2

The same high temperature-calcined solid phosphoric acid catalyst as employed in Example 1 was mixed with sulfanilic acid at such a ratio that the latter amounted to 15 wt. percent of the total catalyst, and the mixture was pulverized and molded. Twenty (20) ml. of the catalyst was employed for decomposition reaction of MDO in the manner similar to Example 1, except that the liquid feed rates of MDO and water were, respectively, 40 ml./2.5 hrs. and 40 ml./2.5 hrs. The quantitative analysis of the decomposition products was performed at every 2.5 hours. After 75 hours, MDO conversion was 82.1%, isoprene yield was 16.35 g., selectivity toward isoprene was 89.0%, and selectivity toward formaldehyde was 82.2%. The weight increase of the catalyst at that time was 84.5%.

EXAMPLE 3

The same high temperature-calcined solid phosphoric acid catalyst as employed in Example 1 was mixed with metanilic acid at such a ratio that the latter amounted to 20 wt. percent of the total catalyst, and the mixure was pulverized and molded. Twenty (20) ml. of the catalyst was used in the decomposition of MDO in the manner similar to Example 2. Quantitative analysis of the decomposition product was performed at every 2.5 hours. After 75 hours of the reaction, the MDO conversion was 82.3%, isoprene yield was 16.6 g., selectivity toward isoprene was 90.2%, and selectivity toward formaldehyde was 81.7%. The weight increase of the catalyst at that time was 85.2%.

EXAMPLE 4

Commercial solid phosphoric acid catalyst (prepared by calcining a mixture of 1 wt. part of diatomaceous earth with 4 wt. parts of ortho-phosphoric acid at 400° C. for several hours) was calcined at 980° C. for 5 hours. When the said catalyst was used in the catalytic decomposition of MDO (hereinafter referred to as "first reaction") at 200° C. for 18 hours, the MDO conversion was reduced from 84.2% at the starting time to 69.5%. Likewise, the selectivity toward isoprene was reduced from 83.0% to 72.1%. The weight increase of the catalyst due to deposition of carbonized by-products was 80.0%. The thus-employed catalyst, which has decreased in activity, was calcined in a quartz tube at 850°–900° C. for 18 hours, and thereafter immersed in a saturated aqueous sulfanilic acid solution at 100° C. for a minute, and then withdrawn and dried. Twenty-five (25) ml. of the catalyst was charged in a tubular reactor maintained at 200° C., and into which MDO (liquid), water (liquid) and nitrogen as a carrier gas were supplied through a vaporizer at the feed rates of, respectively, 45 ml./2.5 hrs., 90 ml./2.5 hrs., and 1 liter/hr., to perform the decomposition reaction. Quantitative analysis of the decomposition products by gas chromatography was performed at every 2.5 hours, and from the results MDO conversion, isoprene yield, and selectivity toward isoprene for each 2.5 hours were calculated. The results are given in Table 1 below.

TABLE 1

| Run No. | MDO conversion (percent) | Isoprene yield (g.) | Selectivity toward isoprene (percent) |
| --- | --- | --- | --- |
| 1. (0–2.5 hrs.) | 83.6 | 17.44 | 82.9 |
| 2. (2.5–5.0 hrs.) | 84.9 | 17.85 | 83.5 |
| 3. (5.0–7.5 hrs.) | 86.4 | 17.74 | 81.6 |
| 4. (7.5–10.0 hrs.) | 85.4 | 17.48 | 81.4 |
| 5. (10.0–12.5 hrs.) | 84.7 | 18.12 | 85.0 |
| 6. (12.5–15.0 hrs.) | 86.3 | 17.91 | 82.5 |
| 7. (15.0–17.5 hrs.) | 86.2 | 18.76 | 86.4 |

Whereas, when the catalyst on which the carbonized by-products had been deposited during the first reaction was calcined at 900° C. for 18 hours to remove the combustible substances, and re-used, without adding sulfanilic acid to the said catalyst, in MDO decomposition reaction under the same conditions as described above, the decrease in the catalytic activity during the period of reaction was remarkable, as indicated in Table 2 below.

TABLE 2

| Run No. | MDO conversion (percent) | Isoprene yield (g.) | Selectivity toward isoprene (percent) |
| --- | --- | --- | --- |
| 1. (0–2.5 hrs.) | 85.2 | 17.33 | 80.8 |
| 2. (2.5–5.0 hrs.) | 77.6 | 15.45 | 79.1 |
| 3. (5.0–7.5 hrs.) | 73.7 | 14.30 | 77.1 |
| 4. (7.5–10.0 hrs.) | 65.5 | 12.73 | 77.2 |

EXAMPLE 5

Diatomaceous earth and ortho-phosphoric acid were mixed at a weight ratio of 1:4 and extruded into a form of 5-mm.φ rod through an extruder, followed by two calcinations at 400° C. for 5 hours (precalcination) and at 1,050° C. for 24 hours. The resulting white, hard calcined product was pulverized to a size of at least 60 meshes. Nineteen (19) wt. parts of the same powder was thoroughly mixed with 1 wt. part of naphthionic acid powder of also at least 60 meshes, and molded into columnar tablets of 5 mm.φ x 3 mm. in size. The tablets were further crushed into ⅓–¼ of the described size, and 15 ml. thereof was charged in a glass tubular reactor of 20 mm.φ which was fixed in an oil bath of 215° C. Separately, into a pre-heater 4-methyl-1,3-dioxane (liquid), water (liquid) and nitrogen gas were supplied at the feed rates of, respectively, 12 ml./hr., and 1 liter/hr., and the resulting gaseous mixture was led to the above fixed catalyst bed to perform the decomposition reaction. The reaction products and unreacted starting material were collected in the same manner as described in Example 1, and subjected to quantitative analysis at every two hours. After 10 hours' reaction, the conversion, and selectivities toward butadiene and formaldehyde were, respectively, 84.3%, 81.8% and 77.8%. After 32 hours reaction, they were 79.0%, 84.9% and 90.8%, respectively. The weight increase of the catalyst at that time was 65.2%.

For comparison, the same catalyst which contained no naphthionic acid was used in the reaction using the same apparatus under the same conditions as described above. After 6 hours of the reaction, conversion of 4-methyl-1,3-dioxane, and selectivities toward butadiene and formaldehyde were, respectively, 79.1%, 83.5% and 75.0%. After 10 hours, however, the values showed rapid decrease such as 62.3%, 68.4%, 73.2% respectively. On the catalyst a large amount of tar-like substance was deposited, the weight increase thereby caused being 80.5%.

EXAMPLE 6

A 1:1 (by weight) mixture of diatomaceous earth and orthophosphoric acid was shaped into a 5 mm.φ rod by means of an extruder, and dried at 200° C. for 3 hours, followed by a calcination at 850° C. for 24 hours. The calcination product was crushed into a uniform grain size of 6–8 meshes, and immersed in a saturated aqueous sulfanilic acid solution of 100° C. for 1 minute. Filtering the solution and drying the solids, 15 ml. of the resulting solid catalyst was charged in a 20 mm.φ glass tubular reactor. The reactor was fixed in an oil bath maintained at 215° C., and into which MDO (liquid), water (liquid), and nitrogen gas were introduced through a vaporizer at the feed rates of, respectively, 10 ml./hr., 10 ml./hr., and 1 liter/hr., to perform the reaction. The collection and quantitative analysis of the reaction products and unreacted starting MDO were performed similarly to the case of Example 1. As the results of very 2 hours' analyses, the MDO conversion and selectivities toward isoprene and formaldehyde after 10 hours of the reaction were, respectively, 65.6%, 80.5%, and 88.7%. Also those after 50 hours of the reaction were, respectively, 59.6%, 78.4%, and 92.7%. The weight increase of the catalyst during the period of reaction was 61.0%.

When the sulfanilic acid treatment was omitted in the foregoing procedures, the MDO conversion and selectivites toward isoprene and formaldehyde under the same reaction conditions were, respectively 67.6%, 76.1%, and 83.5% after10 hours' reaction, and also 49.9%, 68.0%, and 90.7% after 30 hours' reaction. The weight increase of the catalyst at this time was 53.7%.

EXAMPLE 7

Commercial solid phosphoric acid catalyst prepared by calcining 1:4 (weight ratio) mixture of diatomaceous earth and ortho-phosphoric acid at a temperature below 600° C. (trade name N-501, product of Nikki Kagaku Co., Japan.) was calcined at 1000° C. for 98 hours in an electric oven, and 19 wt. parts thereof was mixed with 1 wt. part of 4-amino-toluene-3-sulfonic acid. The mixture was pulverized into a powder of at least 60 meshes, and molded into columnar tablets of 5 mm.$\phi$ x 3 mm. in size. The tablets were further crushed into $\frac{1}{3}$–$\frac{1}{4}$ of the described size, and 15 ml. thereof was used for MDO decomposition reaction under the same procedures and conditions as employed in Example 1. The quantitive analysis of the reaction products was performed at every three hours. The MDO conversion, and selectivities toward isoprene and formaldehyde during 9–12 hours of the respectively, 81.7%, 82.1%, 79.7%. During 27–30 hours, they were 83.2%, 83.0%, and 84.1%, respectively. After 30 hours' reaction, the weight increase of the catalyst was 57.8%.

Whereas, when the catalyst prepared similarly except that the addition of 4-aminotoluene-3-sulfonic acid was omitted, was used in the same MDO decomposition reaction, the above values during 3–6 hours' reaction were, respectively 83.9%, 80.2%, and 71.8%. Also during 9–12 hours, they were 67.5%, 70.3%, and 75.4%, respectively. The weight increase of the catalyst after 12 hours' reaction was 53.7%.

EXAMPLE 8

A catalyst was prepared in the identical manner with Example 5, except that the aromatic aminosulfonic acid added was 10 wt. percent of 4-nitro-2-aminobenzenesulfonic acid based on the total weight of catalyst. The said catalyst was used in MDO decomposition reaction under the same conditions as those of Example 1. The MDO conversion, and selectivities toward isoprene and formaldehyde were, during 9–12 hours reaction 78.5%, 56.3%, and 80.7%, respectively, and during 27–30 hours' reaction, 82.7%; 85.1%, and 83.2%, respectively. The weight increase of the catalyst after 30 hours' reaction was 51.3%.

EXAMPLE 9

Example 8 was repeated except that the aromatic aminosulfonic acid added to the catalyst was 5-bromo-2-aminobenzenesulfonic acid. As the results of every 3 hours' quantitative analysis of the decomposition products, MDO conversion and selectivities toward isoprene and formaldehyde were, respectively, 80.0%, 83.6% and 77.7%, during 9–12 hours' reaction, and also respectively 82.1%, 84.3%, and 81.5% during 27–30 hours' reaction. The weight increase of the catalyst after 30 hours' reaction was 60.8%.

What is claimed is:

1. A method of producing conjugated diolefines by catalytic decomposition of mono- or di-alkyl-1,3-dioxanes in vapor phase, in the presence of steam and a solid phosphoric acid catalyst, and at an elevated temperature, which is characterized in that the said solid phosphoric acid catalyst contains at least one aromatic aminosulfonic acid at a ratio of 0.5 to 50% by weight, based on the total weight of catalyst 2. The method of claim 1, wherein the solid phosphoric acid catalyst is prepared by using a regenerated solid phosphoric acid catalyst obtained by calcining a solid phosphoric acid catalyst to remove the combustible substances deposited thereon during a preceding reaction.

3. The method of claim 1, in which the aromatic aminosulfonic acid is selected from the compounds of the general formulae,

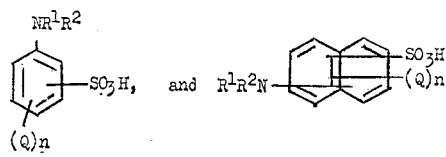

wherein each of $R^1$ and $R^2$ is selected from the group consisting of hydrogen and alkyl radicals of 1–4 carbon atoms, and $R^1$ and $R^2$ may form a heterocyclic group such as alkyleneimino group together with the nitrogen atom, Q is selected from the group consisting of hydrogen, halogen, hydroxy radical, nitro radical, alkyl radicals of 1–4 carbon atoms, and alkoxy radicals of 1–4 carbon atoms, and $n$ is an integer of 1–2, when $n$ is 2 and Q is an alkyl radical, the two alkyl radicals may together form an alkylene chain.

4. The method of claim 1, wherein the aromatic aminosulfonic acid is sulfanilic acid.

5. The method of claim 1, wherein the aromatic aminosulfonic acid is metanilic acid.

6. The method of claim 1, wherein the reaction temperature ranges 100°–300° C.

7. The method of claim 1, wherein the reaction is performed at atmospheric pressure.

8. The method of claim 1, wherein the 1,3-dioxane is 4,4-dimethyl-1,3-dioxane.

9. The method of claim 1, wherein the 1,3-dioxane is 4-methyl-1,3-dioxane.

10. The method of claim 1, wherein the solid phosphoric acid catalyst is prepared by using a high temperature calcination product of a mixture of ortho-phosphoric acid and a carrier composed mainly of silica.

References Cited

UNITED STATES PATENTS 3,221,075 11/1965 Hamomoto et al. _____ 260—681
3,284,534 11/1966 Mitsutani et al. _____ 260—681
3,377,405 4/1968 Hurley et al. _____ 260—681

DELBERT E. GANTZ, Primary Examiner

G. E. SCHITKONS, Assistant Examiner

U.S. Cl. X.R.

252—435